United States Patent [19]
Ishida et al.

[11] Patent Number: 4,987,170
[45] Date of Patent: Jan. 22, 1991

[54] STYRENE RESIN COMPOSITION EXCELLENT IN SLIDING PROPERTIES

[75] Inventors: Yuzuru Ishida; Masahiro Mitsuboshi; Haruo Inoue, all of Kanagawa; Ichiro Otsuka, Tokyo; Keiji Iio, Kanagawa, all of Japan

[73] Assignee: Mitsui Toatsu Chemicals, Inc., Tokyo, Japan

[21] Appl. No.: 404,628

[22] Filed: Sep. 8, 1989

[30] Foreign Application Priority Data

Sep. 13, 1988 [JP] Japan ................................. 63-227501

[51] Int. Cl.$^5$ ................................................ C08K 5/54
[52] U.S. Cl. .................................... 524/267; 524/269; 525/207
[58] Field of Search ................. 524/269, 267; 525/207

[56] References Cited
FOREIGN PATENT DOCUMENTS 62-039610  2/1987  Japan .
63-182361  7/1988  Japan .

Primary Examiner—Paul R. Michl
Assistant Examiner—John J. Guarriello
Attorney, Agent, or Firm—Burns, Doane, Swecker & Mathis

[57] ABSTRACT

A styrene resin composition excellent in sliding properties which comprises 100 parts by weight of a styrene polymer, 2.0 to 4.0 parts by weight of dimethylsilicone oil having a viscosity ranging from 5,000 to 15,000 centistokes at 25° C. and 0.05 to 8 parts by weight of maleic anhydride monomer or 0.05 to 50 parts by weight of a maleic anhydride-styrene copolymer containing at least 5% by weight of maleic anhydride monomer units is herein disclosed. The styrene resin composition is excellent in sliding properties and thus does not provide a molded product having poor appearance during molding. The styrene resin composition is used to form mechanical parts in the fields of household appliances and office automation apparatuses.

9 Claims, No Drawings

STYRENE RESIN COMPOSITION EXCELLENT IN SLIDING PROPERTIES

BACKGROUND OF THE INVENTION

The present invention relates to a styrene resin composition which is excellent in sliding properties and which does not provide molded products having poor appearance during molding.

Considerable progress has recently been made in the technical developments in the fields of household appliances and office automation (OA) apparatuses and the rate of propagation thereof has greatly increased. In such fields of household appliances and OA apparatuses, metallic materials have been increasingly superseded by plastic materials accompanied by progress in mass production techniques and requirements for lighter and smaller apparatuses. Thus there have been used plastics as materials for not only housings of apparatuses but also for so-called mechanical parts such as gears, cams, pulleys, bearings and chassises.

In such fields, there has been principally used engineering plastics such as polyamides, polyacetals, polyester resins and polycarbonates which have excellent mechanical strength such as tenacity, wear and rub resistance, fatigue and creep resistance and rigidity.

It is also desireable to save cost and thus there have been many investigations to develop processing techniques such as a monolithic molding technique and to substitute cheaper plastics for the foregoing plastics. As a result, a portion of the engineering plastics have been replaced by widely used resins reinforced by glass fibers or carbon fibers, for instance ABS resins and PS resins.

It is well known in such industrial fields that a resin composition having self-lubricating properties can be obtained by incorporating silicone oil into a widely used resin such as a styrene resin and it has already been, put into practical use in a sliding part in which polyacetal resins have been mainly utilized, but such a resin composition is not yet always sufficient.

For instance, silicone oil-containing rubber-modified styrene resins as disclosed in Japanese Patent Un-examined Publication (hereinafter referred to as "J.P. KOKAI") No. Sho 60-217254 are excellent in sliding properties, but cause various troubles during molding. More specifically, the amount of silicone oil to be incorporated into the styrene resin should be not less than 2 parts by weight, in most cases, to impart sliding properties required of such applications to the styrene resins. The compatibility between silicone oil and the rubber-modified styrene resins is substantially low and silicone oil is liable to cause separation from the rubber-modified resins within a mold and a molding machine during molding as the added amount thereof increases. This leads to the production of molded products having poor appearance such as the occurrence of silver streaks and burn spots.

To solve this problem, it has been tried to lengthen the molding cycle or to reduce the molding temperature. However, these methods cannot substantially solve the problem since many processes are required for screening the resultant molded products and thus it has been strongly desired to solve the problem as soon as possible.

Furthermore, J.P. KOKAI No. Sho 59-108016 discloses a method for improving the dispersibility of silicone oil in a styrene polymer by adding silicone oil at a specified time in the course of polymerization when a styrene monomer is polymerized in the presence of a rubbery substance, but this method also does not solve the foregoing problem.

In addition, as disclosed in J.P. KOKAI Nos. Sho 62-39610 and Sho 63-182361, it is suggested that the aforementioned problem can be solved if the content of silicone oil in the styrene resins is reduced by simultaneously using silicone oil and other sliding property-improving agents. However, the molded products resulting from such resin compositions are easily peeled off in thin layers at portions adjacent the mold gate and thus the problem has not yet completely been solved.

SUMMARY OF THE INVENTION

The inventors of this invention have conducted various studies in an effort of reaching a solution to this problem. As a result, the inventors have found that it could effectively be solved by providing a resin composition composed of a styrene polymer into which dimethyl silicone oil having a viscosity falling within a specific range and maleic anhydride or a copolymer thereof are incorporated and thus have completed the present invention.

Consequently, the present invention relates to a styrene resin composition which comprises 100 parts by weight of a styrene polymer, 2.0 to 4.0 parts by weight of dimethyl silicone oil having a viscosity ranging from 5,000 to 15,000 centistokes at 25° C. and 0.05 to 8 parts by weight of maleic anhydride monomer or 0.05 to 50 parts by weight of a maleic anhydride-styrene copolymer containing at least 5% by weight of maleic anhydride moiety.

DETAILED DESCRIPTION OF THE INVENTION

The styrene polymer according to the present invention is composed of a polymer derived from a styrene or styrene derivative monomer. The styrene polymers may be prepared according to any known methods such as bulk polymerization, suspension polymerization and emulsion polymerization. Examples of such styrene or styrene derivative monomers include styrene; styrenes whose side chain is replaced with an alkyl group having 1 to 5 carbon atoms, such as alpha-methylstyrene and alpha-ethylstyrene; styrenes whose ring moiety is substituted with an alkyl group having 1 to 5 carbon atoms, such as vinyl toluene and p-methylstyrene; and halogenated styrene such as monochlorostyrene, dichlorostyrene, tribromostyrene and tetrabromostyrene. Particularly preferred are styrene and alpha-methylstyrene. These styrene or styrene derivative monomers may be used alone or in combination. In addition, it is also possible to optionally use these styrene or styrene derivative monomers in combination with other monomers such as acrylonitrile monomers such as acrylonitrile, methacrylonitrile and fumaronitrile; maleimide monomers such as maleimide. N-methylmaleimide and N-phenylmaleimide; and acrylic ester monomers such as methyl acrylate and methyl methacrylate.

In addition, the foregoing styrene polymers may be modified with a rubber-like polymers. Examples of the rubber-like polymers are polybutadiene, styrene-butadiene copolymer, butadiene-acrylonitrile copolymer, ethylenepropylene-diene terpolymers and butadiene-acrylate copolymers.

The rubber-like polymer is dispersed in the rubber-modified resin in the form of particles to form a dispersed phase (hereinafter referred to as "microgel"). On the other hand, the polymers of the styrene or styrene derivative monomers or copolymers thereof with optional other monomers form a continuous phase. The aforesaid microgel also comprises the styrene polymer in the grafted state or occluded state. When examining an electron micrograph of the microgels, they are present as islands surrounded by the continuous phase.

The content of dimethylsilicone oil in the resin composition is in the range of from 2.0 to 4.0 parts by weight and preferably 2.5 to 3.0 parts by weight per 100 parts by weight of the styrene type resin. This is because if the content of dimethylsilicone oil is less than 2.0 parts by weight, sufficient sliding properties cannot be obtained, the reduction in the coefficient of dynamic friction is low and powder of the resin generated due to abrasion is formed when the product is used as a sliding part. On the other hand, if the content exceeds 4.0 parts by weight, the dispersion condition of the dimethylsilicone oil included in the styrene resin becomes unstable, dimethylsilicone oil oozes out of the resin within a mold during heat-processing, such as injection molding, to thus contaminate the surface of the mold, which makes it necessary to wipe the oil fully off the mold at proper time intervals and thus results in the reduction of production efficiency.

Dimethylsilicone oil used in the composition of the present invention is represented by the following general formula:

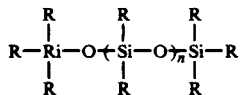

(wherein R represents a methyl group) and its viscosity is defined by the degree of polymerization n.

A variety of products having a viscosity ranging from 0.65 to several hundred thousands centistokes are commercially available. Dimethylsilicone oil having the desired viscosity can also be obtained by admixing dimethylsilicone oil of low viscosity and that of high viscosity.

More specifically, an intended dimethylsilicone oil having a desired viscosity ($\eta$) which can be determined by the following relation by mixing x g of a silicone oil of viscosity $\eta_2$:

$$x\log\eta_1 + y\log\eta_2 = (x+y)\log\eta$$

The viscosity of dimethylsilicone oil measured at 25° C. which is incorporated into the styrene polymer is suitably 5,000 to 15,000 centistokes.

If the viscosity of the dimethylsilicone oil is outside the foregoing range, the dispersion condition of the dimethylsilicone oil in the styrene polymer becomes unstable, non-uniform dispersion of the dimethylsilicone oil in the polymer is observed and the content of the dimethylsilicone oil becomes locally high. Therefore, it is liable to provide injection-molded products having poor appearance (molding defects) such as the occurrence of silver streaks and burn spots on the surface thereof. The viscosity of dimethylsilicone oil is most preferably 10,000 to 13,000 centistokes from the aforesaid viewpoints.

The most remarkable reduction in the coefficient of dynamic friction of the resin composition is observed when dimethyl-silicone oil is used. Other silicone oils such as phenyl methyl silicone oil, chlorophenyl silicone oil, alkylsilicone oils, fluorosilicone oils, amino-modified silicone oils, carboxylic acid-modified silicone oils and alcohol-modified silicone oils show low coefficient of dynamic friction-reducing effect and are also expensive. Therefore, the use thereof is not practically acceptable.

The content of the maleic anhydride monomer unit or moiety in the resin composition ranges from 0.05 to 8 parts by weight and preferably 0.1 to 2 parts by weight per 100 parts by weight of the styrene polymer. This is because if the content f the maleic anhydride monomer units is less than 0.05 part by weight, it is liable to generate molding defects such as the fOrmation of silver streaks and burn spots on the surface of injection-molded products. On the other hand, if it exceeds 8 parts by weight, the maleic anhydride monomers cause polymerization therebetween to thus form a substantial amount of low molecular weight products mainly composed of dimers or trimers thereby causing the reduction in physical properties of the finally obtained styrene polymer in particular, its heat resistance.

The copolymers of maleic anhydride and styrene used herein are those of maleic anhydride monomer and a styrene or styrene derivative monomer. In this respect, the styrene type monomers may be those listed above and particularly preferred are styrene and alpha-methylstyrene which are used alone or in combination. In addition, other monomers such as acrylonitrile monomers, maleimide monomers and acrylic ester type monomers may optionally be used in combination with the foregoing styrene or styrene derivative monomers.

The amount of maleic anhydride monomer units contained in the maleic anhydride-styrene copolymer must be at least 5% by weight and desirably not less than 10% by weight. If the rate thereof is less than 5% by weight, it is liable to generate molding defects such as the occurrence of silver streaks and burn spots on the surface of the resulting injection-molded products.

The maleic anhydride-styrene copolymer as used herein may be modified with a rubber-like polymer.

The content of the maleic anhydride-styrene copolymer in the resin composition ranges from 0.05 to 50 parts by weight and particularly preferably 0.5 to 10 parts by weight per 100 parts by weight of the styrene polymer. This is because if the content is less than 0.05 part by weight, it is liable to generate molding defects such as the occurrence of silver streaks and burn spots on the surface of the resulting injectionmolded products and thus any molding properties-improving effect cannot be expected. On the other hand, if it is more than 50 parts by weight, the sliding properties of the resin composition are lowered and an increase in the coefficient of dynamic friction of the composition is observed.

Even if unsaturated dicarboxylic acid monomers other than maleic anhydride monomer, such as maleic acid, fumaric acid, citraconic acid, mesaconic acid, glutaconic acid, methylene succinic acid and allyl malonic acid are used, the desired improving effects cannot be achieved. On the other hand, unsaturated dicarboxylic anhydrides such as citraconic anhydride which is a modified product of maleic anhydride show the effect of improving molding properties, but it is inferior to that of maleic anhydride. Moreover, organotin maleate compounds such as dibutyltin maleate may be used instead of the maleic anhydride monomer or maleic anhydride-styrene copolymer, but their effect of improving molding properties is very low and they are quite expensive.

In the present invention, the maleic anhydride monomer and the maleic anhydride-styrene copolymer may be used in combination.

The maleic anhydride-styrene copolymers may be prepared according to any known methods such as bulk polymerization, suspension polymerization and emulsion polymerization.

The styrene resin composition of the present invention may be prepared by, for instance, melting and mixing the foregoing specific styrene polymer, dimethylsilicone oil and maleic anhydride monomer or a maleic anhydride-styrene copolymer in a single screw extruder or a twin-screw extruder. Alternatively, it may be prepared by mixing a styrene or styrene derivative monomer, dimethylsilicone oil and a maleic anhydride-styrene copolymer with the styrene polymer during the polymerization of the latter. It may likewise be prepared by melting and mixing maleic anhydride monomers or a maleic anhydride-styrene copolymer with a styrene type polymer containing dimethylsilicone oil within a molding machine during fabrication of the styrene polymer.

EXAMPLES

The present invention will hereinafter be explained in more detail with reference to the following Examples and Comparative Examples. In the following Examples and Comparative Examples, TOPOREX 860-01 available from MITSUI TOATSU CHEMICALS, INC. was used as the styrene type polymer.

The following compounds were employed as dimethylsilicone oil. Viscosity of each compound listed below is expressed in centistokes (c.s.) at 25° C.:

1,000 c.s.: SH200 1,000cSt available from Toray Silicone, Co., Ltd. (Comparative Example 3);

5000 c.s.: SH200 5,000cSt available from Toray Silicone, Co., Ltd. (Example 3);

12,500 c.s.: SH200 12,500cSt available from Toray Silicone, Co., Ltd. (Examples 1, 2 and 4 to 8 and Comparative Examples 1, 2 and 5 to 10); 20,000 c.s.: A 55:45 (weight ratio) mixture of SH200, 30,000 cSt and SH200 12,500 cSt (both available from Toray Silicone, Co., Ltd. (Comparative Example 4).

Moreover, SH710 (available from Toray Silicone, Co., Ltd.) was used as methylphenyl silicone oil (Comparative Example 11).

As the maleic anhydride-styrene copolymers, the following compounds were used (in the following compounds listed, "MAC" means "the content of the maleic anhydride monomer units"):

MAC=8% by weight: DYLARK 232 available from ARCO CO., LTD. (Example 5 and Comparative Example 8);

MAC=24% by weight: SMA 3,000 available from SARTOMER CO., LTD. (Example 6);

MAC=48% by weight: SMA 1,000 available from SARTOMER CO., LTD. (Examples 7 and 8).

The maleic anhydride-styrene copolymer having a maleic anhydride monomer unit content of 3% by weight was prepared according to the following manner:

To a 30-liter reaction vessel equipped with a stirrer which is provided with a hole for supplying monomers therethrough at the lower portion thereof and a hole for discharging a polymerization solution at the upper portion thereof there was continuously supplied a monomer mixture composed of 98.5% by weight of styrene monomer and 1.5% by weight of maleic anhydride monomer in the form of a liquid at a rate of 15 liters per hour to perform the polymerization of these monomers therein. During the polymerization, the temperature of the reaction vessel was maintained at 45° C. and the polymerization was continued until the conversion of the monomer reached 50% with continuously discharging a polymerization solution through the hole for discharging the same.

After cooling 5 kg of the polymerization solution thus obtained down to 50° C., the solution was poured into 20 liters of methanol to thus obtain 2.5 kg of maleic anhydride-styrene copolymer as cotton-like solid. The copolymer was filtered off and subjected to air-drying to obtain a sample. The content of the maleic anhydride monomer units in the resultant copolymer was evaluated to be 3% by weight as estimated from the amount of unreacted monomers in the methanol solution analyzed by gas chromatography. This copolymer was used in Comparative Example 7.

Tests for the following physical properties of the resin composition are performed as follows:

(1) Determination of Coefficient of Dynamic Friction: Utilizing a thrust abration tester, the coefficient of friction with polystyrene resin (TOPOREX 860-01) was determined under the following conditions: sliding velocity of 1.2 m/min; load of 1.2 kg.

(2) Amount of Dimethylsilicone Oil Adhered to the Surface of Mold: Using a box-like mold of a size 120 mm×150 mm×12 mm and 1 mm thickness, the amount of dimethylsilicone oil adhered to the surface of the mold was determined by repeating shot molding 1000 times at a molding temperature of 220° C., wiping the adhered dimethylsilicone oil off the surface of the mold and measuring the weight of the oil wiped off by a fluorescent X-ray method. The amount was expressed in the ratio (ppm) with respect to the amount of the resin required for molding.

(3) Silver Streaks and Burn Spots of Molded Products: This was determined by repeating shot molding 1000 times at a molding temperature of 220° C. utilizing the aforesaid mold and visually observing the appearance of the molded products. The silver streaks and burn spots are expressed in the number of molded products having silver streaks and spots.

(4) Heat Distortion Temperature: This was determined according to ASTM-D 648.

EXAMPLE 1

100 Parts by weight of an impact resistant polystrene resin (available from MITSUI TOATSU CHEMICALS, INC. under the trade name of TOPOREX 860-01), 2.5 parts by weight of dimethylsilicone oil having a viscosity of 12,500 centistokes at 25° (available from Toray Silicone Co., Ltd. under the trade name of SH200 12,500 cSt) and 0.1 part by weight of maleic anhydride monomer were blended in a tumbling barrel for 15 minutes further melted and mixed in a twin-screw extruder "AS-30" (manufactured and sold by NAKATANI Co., Ltd.) and then the mixture was pelletized to obtain the Sample.

According to the foregoing methods, the coefficient of dynamic friction, the amount of silicone oil adhered to the surface of the mold, the presence or absence of silver streaks and burn spots on the resultant molded product and the heat deformation temperature of the Sample were determined and the results obtained were listed in Table I given below.

EXAMPLES 2 AND 4 AND COMPARATIVE EXAMPLES 1, 2, 5 AND 6

Resin compositions were prepared and their physical properties were evaluated according to the same manner as in Example 1 except that the amount of dimethylsilicone oil and maleic anhydride monomer added was changed to those listed in Table I. The results are summarized in Table I given below.

EXAMPLE 3 AND COMPARATIVE EXAMPLES 3 AND 4

Resin compositions were prepared and their physical properties were evaluated according to the same manner as in Example 1 except that the viscosity of dimethylsilicone oil and the amount of maleic anhydride monomer added were changed to those listed in Table I. The results are summarized in Table I given below.

EXAMPLES 5 TO 5 AND COMPARATIVE EXAMPLES 7 AND 8

Resin compositions were prepared and their physical properties were evaluated according to the same manner as in Example 1 except that maleic anhydride-styrene copolymers having different contents of maleic anhydride monomer units were used in the amounts shown in Table I instead of maleic anhydride monomer. The results obtained are listed in Table I.

EXAMPLE 8

Resin compositions were prepared and their physical properties were evaluated according to the same manner as in Example 1 except that maleic anhydride monomer and maleic anhydride-styrene copolymer were simultaneously employed. The results are summarized in Table I.

COMPARATIVE EXAMPLE 9

Resin compositions were prepared and their physical properties were evaluated according to the same manner as in Example 1 except that one part by weight of maleic acid was used in place of maleic anhydride monomer. The results are summarized in Table I below.

COMPARATIVE EXAMPLE 10

Resin compositions were prepared and their physical properties were evaluated according to the same manner as in Example 1 except that one part by weight of dibutyltin maleate (available from SANKYO ORGANIC SUBSTANCES SYNTHESIZING CO., LTD. under the trade name of "STAN BMN") was used in place of maleic anhydride monomer. The evaluated results are summarized in Table I below.

COMPARATIVE EXAMPLE 11

In this Comparative Example, methylphenyl silicone oil was used as a silicone oil component. Resin compositions were prepared and their physical properties were evaluated according to the same manner as in Example 1 except that the amount of silicone oil added was changed to those listed in Table I. The results are summarized in Table I below.

TABLE I

| | | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|---|
| Styrene Polymer (part by weight) | | 100 | 100 | 100 | 100 | 100 | 100 | 100 | 100 | 100 | 100 |
| Dimethylsilicone Oil | Amount Added (part by weight) | 2.5 | 3.5 | 3.5 | 2.5 | 2.5 | 2.5 | 2.5 | 2.5 | 1.5 | 4.3 |
| | Viscosity (centistokes) | 12,500 | 12,500 | 5,000 | 12,500 | 12,500 | 12,500 | 12,500 | 12,500 | 12,500 | 12,500 |
| Maleic Anhydride monomer (part by weight) | | 0.1 | 2 | 2 | 5 | — | — | — | 0.05 | 0.1 | 2 |
| Maleic Anhydride-Styrene Copolymer | Content of Maleic Anhydride Monomer Unit (% by weight) | — | — | — | — | 8 | 24 | 48 | 48 | — | — |
| | Amount Added (part by weight) | — | — | — | — | 40 | 5 | 1.5 | 0.5 | — | — |
| Coefficient of Dynamic Friction | | 0.22 | 0.23 | 0.23 | 0.25 | 0.24 | 0.22 | 0.21 | 0.22 | 0.33 | 0.21 |
| Amount of Silicone Oil Adhered to the Surface of Mold (ppm) | | 0.03 | 0.03 | 0.05 | 0.02 | 0.03 | 0.03 | 0.03 | 0.03 | 0.03 | 0.59 |
| Silver Streaks and Burn Spots (Shot number) | | 0 | 0 | 0 | 0 | 0 | 0 | 0 | 0 | 0 | 1 |
| Heat distortion Temp. (°C.) | | 88 | 86 | 86 | 84 | 90 | 88 | 88 | 88 | 88 | 86 |

| | | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|
| Styrene Polymer (part by weight) | | 100 | 100 | 100 | 100 | 100 | 100 | 100 | 100 | 100 |
| Dimethylsilicone Oil | Amount Added (part by weight) | 2.5 | 2.5 | 2.5 | 2.5 | 2.5 | 2.5 | 2.5 | 2.5 | Methylphenyl Silicon Oil 3.0 |
| | Viscosity (centistokes) | 1,000 | 20,000 | 12,500 | 12,500 | 12,500 | 12,500 | 12,500 | 12,500 | 500 |
| Maleic Anhydride monomer (part by weight) | | 0.1 | 0.1 | 10 | 0.02 | — | — | Maleic Acid 1 | Dibutyltin Maleato 1 | 0.1 |
| Maleic Anhydride-Styrene Copolymer | Content of Maleic Anhydride Monomer Unit (% by weight) | — | — | — | — | 3 | 8 | — | — | — |

TABLE I-continued

|  | | | | | | | | | |
|---|---|---|---|---|---|---|---|---|---|
| Amount Added (part by weight) | — | — | — | — | 50 | 70 | — | — | — |
| Coefficient of Dynamic Friction | 0.22 | 0.23 | 0.26 | 0.22 | 0.22 | 0.34 | 0.22 | 0.22 | 0.35 |
| Amount of Silicone Oil Adhered to the Surface of Mold (ppm) | 0.07 | 0.03 | 0.02 | 0.04 | 0.19 | 0.02 | 0.16 | 0.04 | 0.01 |
| Silver Streaks and Burn Spots (Shot number) | 10 | 57 | 0 | 21 | 76 | 0 | 322 | 4 | 0 |
| Heat distortion Temp. (°C.) | 88 | 88 | 72 | 88 | 88 | 90 | 86 | 86 | 88 |

As may be seen from the results listed in Table I, the resin composition according to the present invention is excellent in sliding properties and thus the present invention makes it possible to solve the problem of poor appearance during molding accompanied by conventional resin compositions. Surprisingly, the resin composition of the present invention is also effective for preventing abnormal abrasion which is often caused between a screw and a cylinder in a molding machine while molding a resin containing silicone oil.

What is claimed is:

1. A styrene type resin composition excellent in sliding properties which comprises 100 parts by weight of a styrene polymer, 2.0 to 4.0 parts by weight of dimethylsilicone oil having a viscosity ranging from 5,000 to 15,000 centistokes at 25 and 0.05 to 8 parts by weight of maleic anhydride monomer or 0.05 to 50 parts by weight of a maleic anhydride-styrene copolymer containing at least 5% by weight of maleic anhydride monomer units.

2. A composition as set forth in claim 1 wherein the content of dimethylsilicone oil ranges from 2.5 to 3.0 parts by weight per 100 parts by weight of the styrene polymer.

3. A composition as set forth in claim 1 wherein the viscosity of dimethylsilicone oil at 25° ranges from 10,000 to 13,000 centistokes.

4. A composition as set forth in claim 1 wherein the content of the maleic anhydride monomer ranges from 0.1 to 2 parts by weight per 100 parts by weight of the styrene polymer.

5. A composition as set forth in claim 1 wherein the content of the maleic anhydride-styrene copolymer ranges from 0.5 to 10 parts by weight per 100 parts by weight of the styrene polymer.

6. A composition as set forth in claim 1 wherein the styrene polymer is a rubber-modified styrene resin.

7. A composition as set forth in claim 6 wherein the rubber-modified styrene type resin includes a rubber-like polymer selected from polybutadiene, styrenebutadiene copolymer, butadiene-acrylonitrile copolymer, ethylene-propylene-diene terpolymers, butadiene-acrylate copolymers and mixtures thereof.

8. A composition as set forth in claim 1 wherein the styrene polymer is a polymer derived from at least one of styrene, alpha alkyl substituted styrene, alkyl substituted styrene, and halogenated styrene.

9. A composition as set forth in claim 8 wherein the styrene polymer is a polymer derived from at least one of styrene and alpha-methylstyrene.

* * * * *

UNITED STATES PATENT AND TRADEMARK OFFICE
CERTIFICATE OF CORRECTION

PATENT NO. : 4,987,170

DATED : January 22, 1991

INVENTOR(S) : Ishida, et al

It is certified that error appears in the above-identified patent and that said Letters Patent is hereby corrected as shown below:

Col. 9, claim 1, line 1, delete "type"; and line 5, delete "25" and insert therefor --25°C--.

Col. 10, claim 3, line 2, delete "25°" and insert therefor --25°C--.

Col. 10, claim 7, line 2, delete "type".

Signed and Sealed this

Twenty-second Day of September, 1992

Attest:

DOUGLAS B. COMER

Attesting Officer      Acting Commissioner of Patents and Trademarks